(12) United States Patent
Hashimoto et al.

(10) Patent No.: US 11,003,168 B2
(45) Date of Patent: May 11, 2021

(54) CONTROLLER FOR GEAR CUTTING MACHINE

(71) Applicant: Fanuc Corporation, Yamanashi (JP)

(72) Inventors: Shoutarou Hashimoto, Yamanashi (JP); Yukio Toyozawa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/588,038

(22) Filed: Sep. 30, 2019

(65) Prior Publication Data

US 2020/0103854 A1 Apr. 2, 2020

(30) Foreign Application Priority Data

Oct. 2, 2018 (JP) .............................. JP2018-187582

(51) Int. Cl.
  *G05B 11/32* (2006.01)
  *G05B 19/414* (2006.01)
  *B23F 9/02* (2006.01)
  *B23F 23/00* (2006.01)
  *B23F 9/10* (2006.01)

(52) U.S. Cl.
  CPC .......... *G05B 19/4141* (2013.01); *B23F 9/025* (2013.01); *B23F 9/10* (2013.01); *B23F 23/006* (2013.01)

(58) Field of Classification Search
  CPC .............. G05B 19/404; G05B 19/4141; G05B 11/011; G05B 19/182; G05B 2219/41189; G05B 2219/41195; G05B 2219/45214
  See application file for complete search history.

(56) References Cited

U.S. PATENT DOCUMENTS

2009/0281652 A1* 11/2009 Tashiro ................ G05B 19/404
700/178

FOREIGN PATENT DOCUMENTS

| JP | 56076330 A | 6/1981 |
|---|---|---|
| JP | 07314249 A | 12/1995 |
| JP | 3986320 B2 | 10/2007 |
| JP | 4043996 B2 | 2/2008 |
| JP | 5308404 B2 | 10/2013 |
| JP | 2014069259 A | 4/2014 |
| JP | 2014159063 A | 9/2014 |
| JP | 5815784 B2 | 11/2015 |
| JP | 2015188994 A | 11/2015 |
| JP | 5863860 B2 | 2/2017 |

* cited by examiner

*Primary Examiner* — Karen Masih
(74) *Attorney, Agent, or Firm* — RatnerPrestia

(57) ABSTRACT

Provided is a controller for controlling a gear cutting machine having a plurality of axes, the controller including an axis information storage unit configured to store data related to control of the plurality of axes during machining, and a disturbance component identification unit configured to identify a component of disturbance with respect to the plurality of axes using the data stored by the axis information storage unit and measurement results of machining accuracy of a workpiece machined by the cutting machine.

7 Claims, 13 Drawing Sheets

CONTROLLER FOR GEAR CUTTING MACHINE

CROSS-REFERENCE TO RELATED APPLICATIONS

This application is a new U.S. patent application that claims benefit of Japanese Patent Application No. 2018-187582, dated Oct. 2, 2018, the disclosure of this application is being incorporated herein by reference in its entirety for all purposes.

BACKGROUND OF THE INVENTION

1. Field of the Invention

The present invention relates to a controller for controlling the driving of the drive axes of a gear cutting machine.

2. Description of Related Art

Generally, machine tools which perform gear cutting operate through the synchronous and collaborative motion of a plurality of axes driven by motors. As an example of such a gear cutting machine, gear generation cutting machines are known. In gear generation cutting machines, a workpiece is fixed to a rotating workpiece axis, a tool is rotated about a tool axis, and the motor for the workpiece axis and the motor for the tool axis are controlled so that the tool axis and the workpiece axis rotate in synchronization.

In such machine tools which perform machining of a workpiece by synchronizing two axes, vibrations, which exert an influence on machining accuracy, may occur in some cases due to disturbance factors. Japanese Patent No. 3986320B and Japanese Patent No. 5308404B describe measuring the machining accuracy of a workpiece and correcting the position, etc., of a grinding wheel using the results of the measurement.

SUMMARY OF THE INVENTION

Disturbances which influence machining accuracy of a workpiece are considered to include components which are caused by position deviation of the tool axis or workpiece axis, synchronization errors, and mechanical vibrations of the mechanisms. In order to improve the machining accuracy of the workpiece, identification of disturbance components which exert an influence on machining accuracy is important.

An aspect of the present disclosure provides a controller for controlling a gear cutting machine having a plurality of axes, the controller comprising an axis information storage unit configured to store data related to control of the plurality of axes during machining, and a disturbance component identification unit configured to identify a component of disturbance with respect to the plurality of axes by using the data stored by the axis information storage unit and measurement results of machining accuracy of a workpiece machined by the gear cutting machine.

BRIEF DESCRIPTION OF THE DRAWINGS

The object, features, and advantages of the present invention will become clearer from the description of the embodiments below referring to the attached drawings. In the attached drawings.

DETAILED DESCRIPTION

Figure 1:
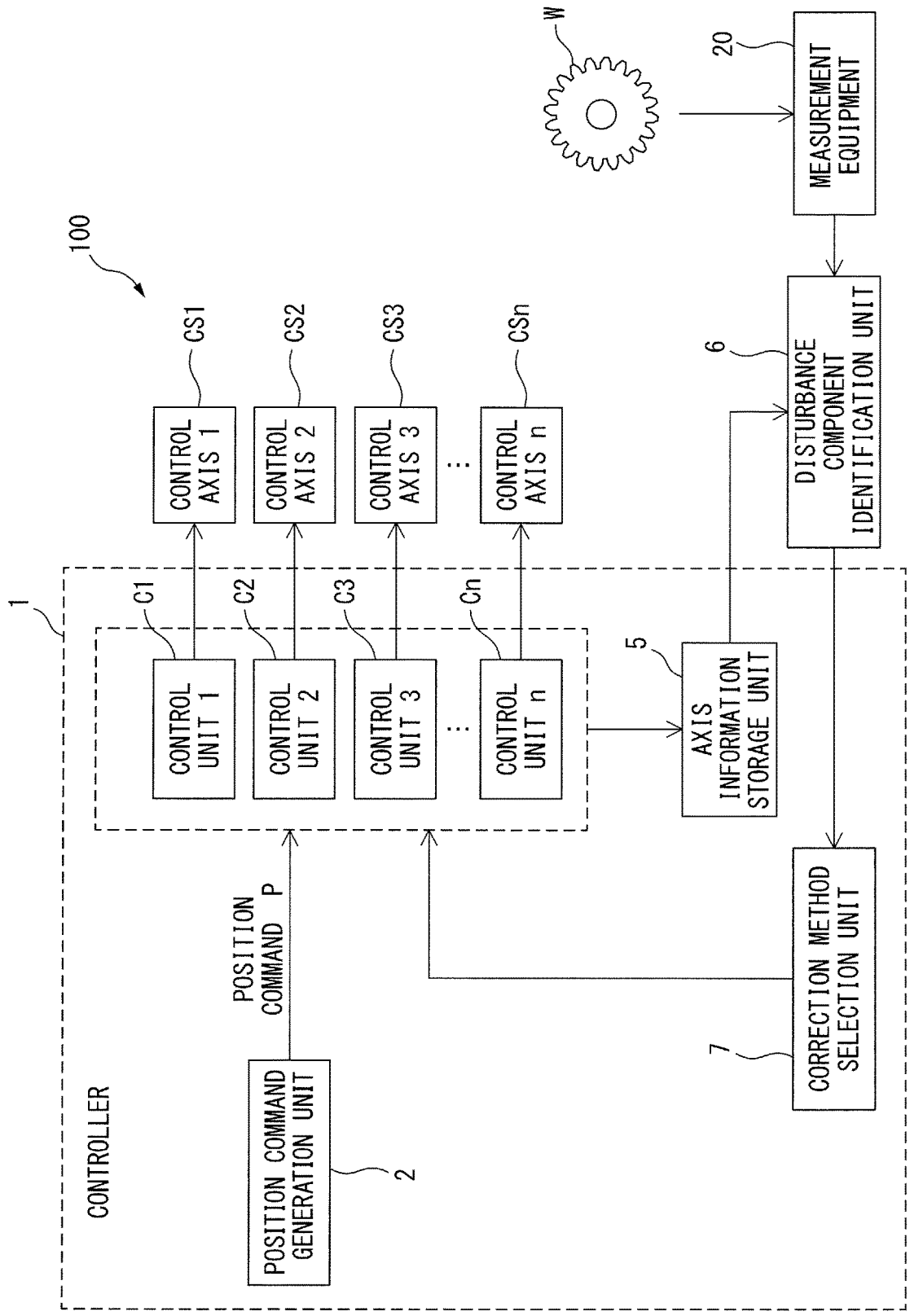
FIG. 1 is a block diagram showing the overall structure of a machine tool comprising the controller according to an embodiment.

The embodiments of the present disclosure will be described below with reference to the attached drawings. In the drawings, corresponding constituent elements are assigned common reference signs. In order to facilitate understanding, the scales of the drawings have been appropriately modified. Furthermore, the forms shown in the drawings are merely examples for carrying out the present invention, and the present invention is not limited to the illustrated forms.

FIG. 1 is a block diagram showing the overall configuration of a machine tool 100 including a controller 1 according to an embodiment. The machine tool 100 is, for example, a gear generation grinding machine, a skiving machine, or a bobbing machine. The machine tool 100 shown in FIG. 1 comprising the controller 1, n control axes CS1 to CSn including respective motors and drive axes, measurement equipment 20 for measuring machining accuracy of a workpiece W, and a disturbance component identification unit 6. The controller 1 includes a position command generation unit 2, control units C1 to Cn for controlling the control axes CS1 to CSn, respectively, an axis information storage unit 5, and a correction method selection unit 7. Note that the disturbance component identification unit 6 may be provided in the controller 1. A position command P (a command vector formed of n elements) for rotation of the control axes CS1 to CSn generated by the position command generation unit 2 is input to the control units C1 to Cn, and rotation of the control axes CS1 to CSn is controlled in accordance with the position command P.

The controller 1 may be constituted as a computer including a CPU, ROM, RAM, etc. In the controller 1, the control between the control units C1 to Cn and the control axes CS1 to CSn may be feedback synchronization control in which feedback of a master axis is multiplied by a synchronization ratio in order to produce a command for a slave axis, or may be command synchronization control in which a command for a master axis is multiplied by a synchronization ratio to produce a command for a slave axis. The functional blocks shown in FIG. 1 may be implemented by dedicated hardware, or alternatively, may be implemented through cooperation between hardware and functions realized by the execution of software by the CPU.

In the machine tool shown in FIG. 1, vibrations caused by disturbance may influence the machining accuracy of the workpiece W. In order to precisely correct such disturbances, which influence machining accuracy, identification of disturbance components (frequency, amplitude, etc., of the disturbance) is important. By identifying the disturbance components, factors which directly cause disturbance (e.g., position deviation of a tool axis having a certain frequency peak) can be identified, and an effective correction method for improving the machining accuracy can be applied. The machine tool 100 according to the present embodiment comprises, as constituent elements for identifying a disturbance component and applying an effective correction method, the measurement equipment 20, the axis information storage unit 5, the disturbance component identification unit 6, and the correction method selection unit 7.

The axis information storage unit 5 stores axis data at the time of actual machining of the workpiece W. The axis data includes position deviation, which is the deviation of the detected position of each axis from the command position, and synchronization errors. When a first axis and a second axis are rotated in synchronization, by converting the position feedback of the first axis into a value corresponding to the position feedback of the second axis using a synchronization ratio, the synchronization error can be acquired as the difference between the converted position feedback of the first axis and the position feedback of the second axis. The disturbance component identification unit 6 identifies the disturbance component which has an influence on the machining accuracy of the workpiece W based on the axis data stored in the axis information storage unit 5 and the machining accuracy measured by the measurement equipment 20. The correction method selection unit 7 selects an efficient correction method for correcting the position deviation, etc., of the axes from among a plurality of types of correction methods set in advance, in accordance with the disturbance component identified by the disturbance component identification unit 6.

Figure 2:
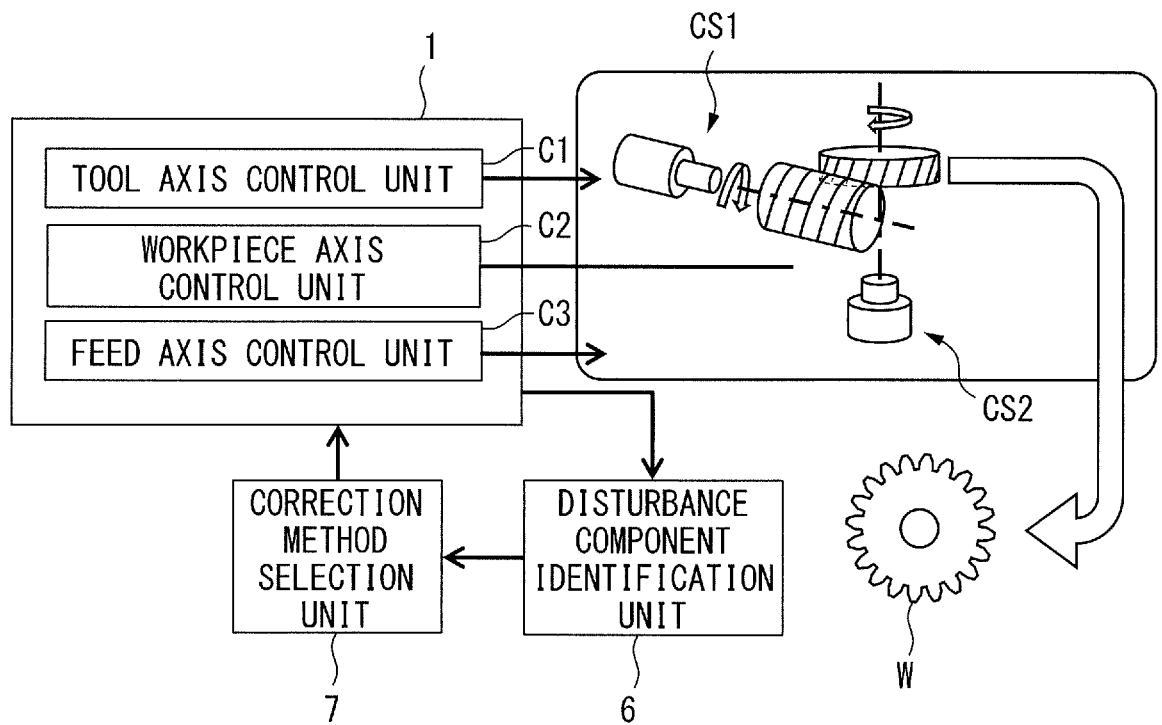
FIG. 2 is a view showing a configuration example in the case in which the machine tool is constituted as a gear generation grinding machine.

The case in which the machine tool 100 is a gear generation grinding machine for forming a helical gear as the workpiece W by gear generation cutting will be described below. FIG. 2 shows a configuration example in which the machine tool 100 is constituted as a gear generation cutting machine. In this case, as shown in FIG. 2, the controller 1 comprises a tool axis control unit C1, a workpiece axis control unit C2, and a feed axis control unit C3 as the control units C1, C2, and C3. The control axes CS1, CS2, and CS3 are constituted as the tool axis CS1, the workpiece axis CS2, and the feed axis CS3 (not illustrated), respectively.

Figure 3:
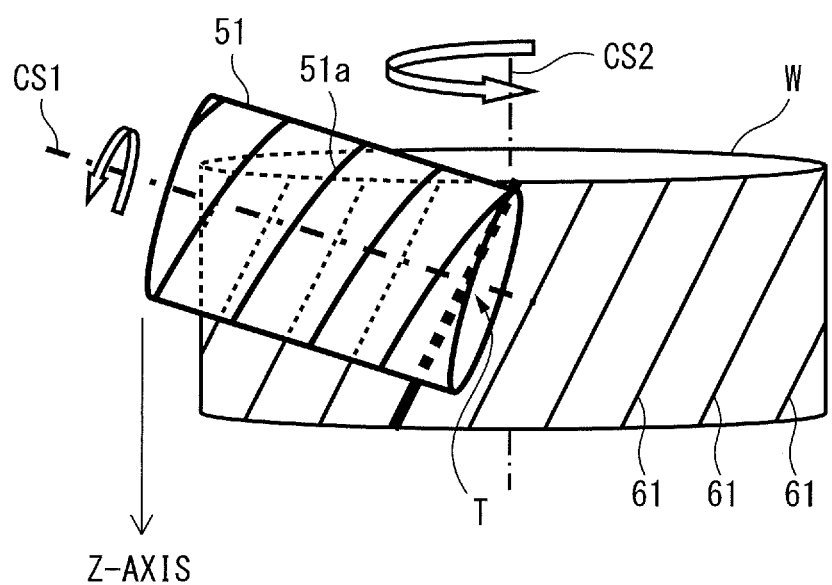
FIG. 3 is an enlarged view showing the vicinity of the workpiece on the machine, and shows a state in which gear generation cutting is performed.

FIG. 3 is an enlarged view of the vicinity of the workpiece in the machine tool 100, and schematically shows the state in which gear generation grinding is performed. A helical blade 51a is formed on the surface of a grinding wheel 51, which is the tool fixed to the tool axis CS1. The workpiece W is a helical gear having inclined tooth traces 61 formed in advance by subjecting the workpiece W to rough processing by bobbing or skiving. The workpiece axis CS2 is set parallel to the Z-axis. The grinding wheel 51 is rotated around the tool axis CS1, which is arranged so as to be inclined relative to a plane which is perpendicular to the Z-axis, and the workpiece W is rotated in synchronization with the rotation of the tool axis CS1 at a predetermined synchronization ratio. The grinding wheel 51 is moved from upwards to downwards in the Z-axis direction by the driving of the feed axis CS3 while causing the grinding wheel 51 to contact the tooth trace of the workpiece W. As a result, all of the tooth traces of the workpiece W are ground. Note that in FIG. 3, for ease of understanding, the helical blade 51a on the grinding wheel 51 and the plurality of tooth traces 61 created on the circumferential surface of the workpiece W are represented using solid lines, and reference signs are assigned to only a part of the tooth traces.

The following steps will be described below as the method for identifying the disturbance component:

(1) Identifying the disturbance component according to undulation in a tooth trace direction (tooth trace error)

(2) Identifying the disturbance component according to undulation in a tooth profile direction (tooth profile error)

Figure 4:
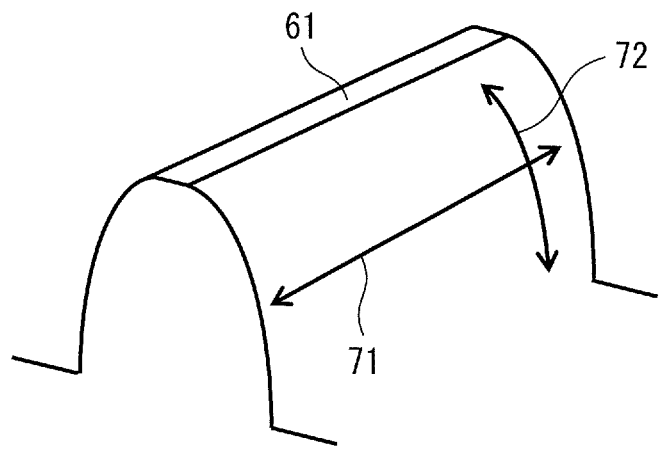
FIG. 4 is a view detailing the tooth trace direction and tooth profile direction on the tooth trace of the workpiece.

(3) Identifying the disturbance component according to a single pitch error (4) Identifying the disturbance component according to an amplitude of a position deviation In the machine tool 100, undulation (tooth trace error) formed on the workpiece W in the tooth trace direction when vibration of the tool axis CS1 occurs as disturbance will be examined. The workpiece W is a helical gear having a helix angle $\theta$. First, technique for determining the undulation created by the disturbance on the workpiece W in the tooth trace direction by calculation will be presented below. Next, undulation on the actually machined workpiece W in the tooth trace direction is measured. The disturbance component is identified by comparing the undulation in the tooth trace direction determined by calculation with the undulation in the tooth trace direction caused on the machined workpiece. The undulation in the tooth trace direction represents irregularities in a depth direction with respect to a surface (tooth surface) of the workpiece W and is caused in the direction of the tooth trace 61 (the tooth trace direction 71) on the circumferential surface of the workpiece W, as shown in FIG. 4. On the other hand, undulation in the tooth profile direction 72 (tooth profile error) represents irregularities in the depth direction with respect to the surface of the workpiece W (tooth surface) and is caused in the direction perpendicular to the tooth trace direction 71.

Figure 5:
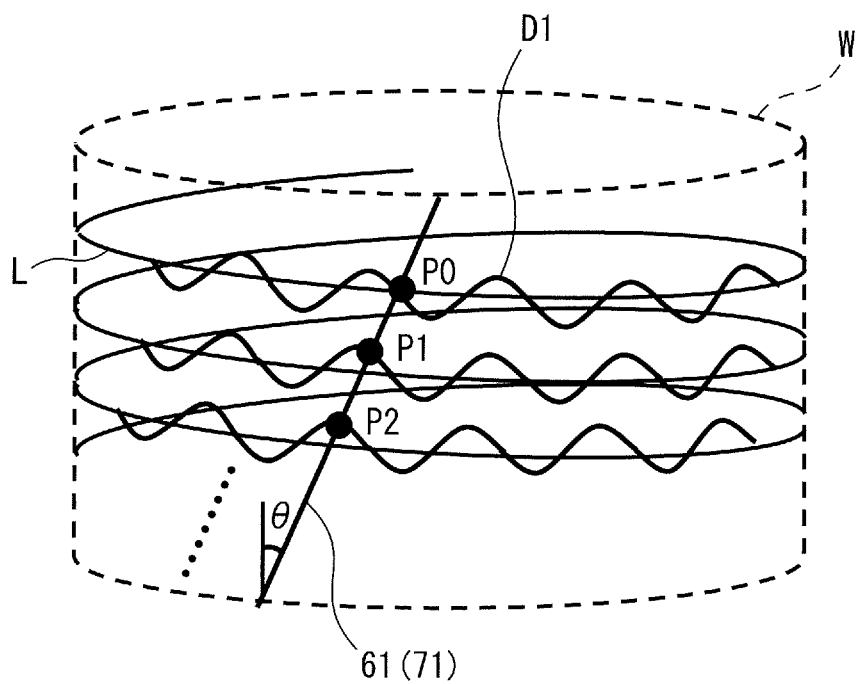
FIG. 5 is a view detailing the locus of contact points of the grinding wheel on the surface of the workpiece, position deviation, sampling points of undulation in the tooth trace direction, etc.

As shown in FIG. 5, when the workpiece W is considered as fixed, the locus L formed on the circumferential surface of the workpiece W at the contact point T (refer to FIG. 3) between the grinding wheel 51 and the circumferential surface of the workpiece W is helical. The vibration D1 caused by the tool axis CS1 as a result of the disturbance is represented in FIG. 5 as a wavy solid line. Note that though this vibration D1 actually corresponds to unevenness in the depth direction with respect to the tooth surface, in FIG. 5, the vibration D1 is represented by the illustrated waveform for the sake of convenience. The undulation in the tooth trace direction 71 can be calculated by sampling the vibration of the tool axis CS1 along the tooth trace direction 71 using the axis data. Note that the frequency of the vibration of the tool axis CS1 is sufficiently higher than the frequency of sampling. The data representing the vibration of the tool axis CS1 can be obtained from the axis data (the feedback values from the position sensors (encoders) provided on each drive axis) stored in the position information storage unit 5.

Figure 6:
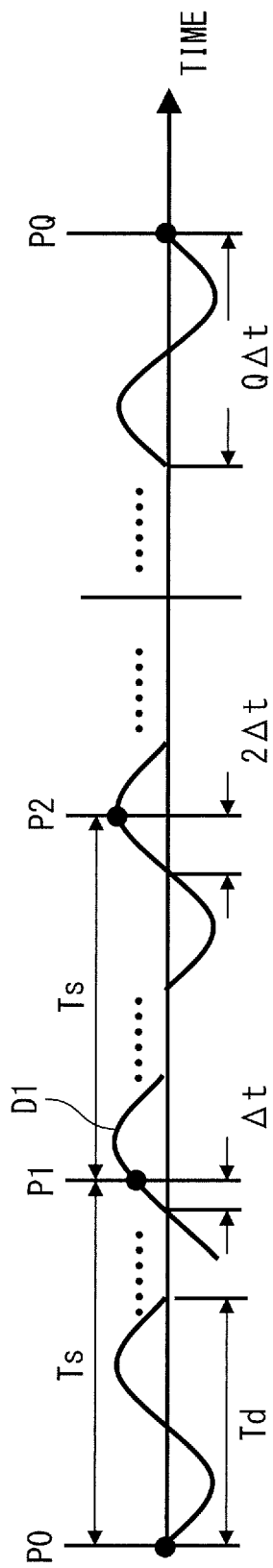
FIG. 6 is a graph representing tool axis vibration along the time axis.

FIG. 6 is a graph in which the vibration D1 of the tool axis CS1 is shown along the time axis. As shown in FIG. 5, regarding positions of the sampling points (P0, P1, P2, ..., PQ) on the vibration D1 along the tooth trace direction, the phase of each of the positions on the vibration D1 shifts at every sampling point; however, at sampling point PQ, the phase of the position again matches with the phase of the vibration D1. When the minimum value of the difference between the sampling period Ts and the integral multiple of the vibration period Td is defined as Δt, phase shifts at sampling points P1 and P2 with respect to the vibration D1 are defined as Δt and 2Δt, respectively, and the phase shift at sampling point PQ is ΔQt. Sampling points P0 to PQ correspond to one cycle of undulation generated in the tooth trace direction. These relationships can be rearranged as follows.

Δt=|sampling period (Ts)−N×vibration period (Td)|, where N is a natural number.
Vibration frequency (fd)=1/(Q×Δt)
Undulation period=sampling period (Ts)×Q
From the above relational formulas, the undulation frequency can be defined as follows.

Undulation frequency=MIN|vibration frequency (fd)−N×sampling frequency (Fs)| (1), where N is a natural number.

Figure 7:
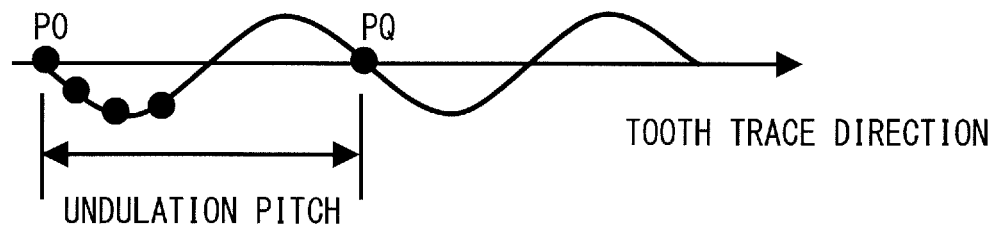
FIG. 7 is a graph in which the values of undulation are plotted in the tooth trace direction at the sampling points.

FIG. 7 is a graph in which the values of the undulation at the sampling points (P0, P1, P2, ..., PQ) in the tooth trace direction are plotted. The pitch (length) of the undulations in the tooth trace direction can be determined as shown below using the undulation period determined as described above and the tooth trace directional component of the feed speed in the Z-axis direction of the tool axis CS1.

Undulation pitch=undulation period×(Z-axis feed speed)/cosθ

Figure 8:
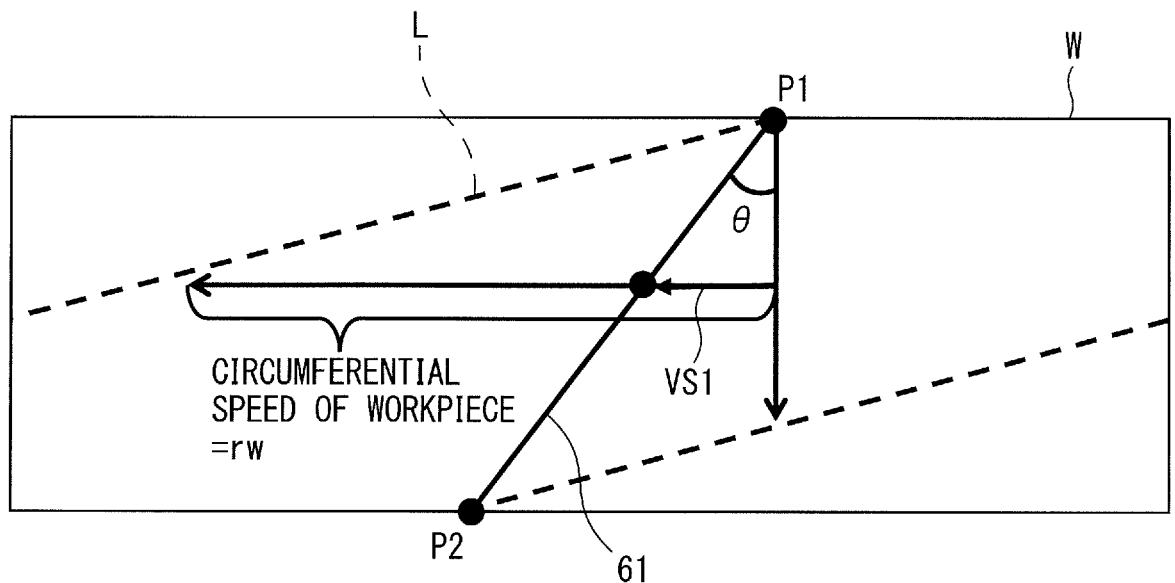
FIG. 8 is a view detailing the sampling period of undulation in the tooth trace direction.

Next, the sampling period (Ts) is determined when the number of rotations of the workpiece axis CS2 is defined as ω (rad/s), and the helix angle is defined as θ. A coordinate system in which the workpiece W is fixed, as shown in FIG. 8, will be assumed. The sampling period Ts can be considered as the time required to complete one rotation around the workpiece at the movement speed of the contact point T as viewed from the tooth trace 61. When the radius of the workpiece is defined as r (mm), the circumferential speed of the workpiece is rω (mm/s), and when the movement speed of the tool axis in the Z-axis direction is defined as Vz, the movement speed VS1 of the tooth trace 61 in the circumferential direction as viewed from the Z-axis is Vz×tanθ. In other words, when the direction of rotation is as indicated in FIG. 8, the movement speed of the contact point T as viewed from the tooth trace 61 is rω−Vz×tanθ. In consideration of the foregoing, the sampling period (Ts) in the tooth trace direction is determined as follows.

$$Ts = \frac{2\pi r}{r\omega - Vz \times \tan\theta}$$

When the rotation direction is the direction opposite of that shown in FIG. 8, the sampling period (Ts) is as follows.

$$Ts = \frac{2\pi r}{r\omega + Vz \times \tan\theta}$$

The sampling frequency (Fs) is determined as the inverse of Ts. Note that the sampling period Ts is the time from when the tool fixed to the tool axis CS1 to rotate therewith cuts a single tooth trace on the workpiece W until the tool again cuts the same tooth trace, in accordance with the rotation of the workpiece W.

Figure 9:
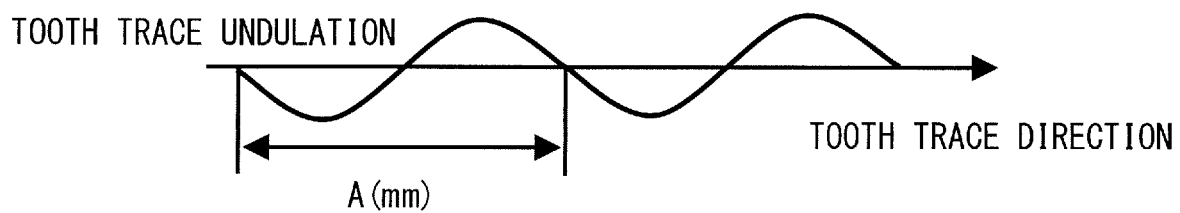
FIG. 9 is a view showing measured undulation pitch in the tooth trace direction.

In consideration of the foregoing, the undulation frequency in the tooth trace direction can be determined by calculation using the axis data. Next, undulation in the tooth trace direction of an actually machined workpiece W is measured. Assume that the pitch of the undulation in the tooth trace direction is measured as A (mm) by the measurement equipment 20 as shown in FIG. 9. From the measurement results of FIG. 9, the undulation frequency can be defined as follows.

(undulation frequency)=Vz/(A×cos θ)

Since the undulation frequency is defined as formula (1), the following equivalent formula can be obtained.

MIN|fD−N×Fs|=Vz/(A×cos θ) (2)

Figure 10:
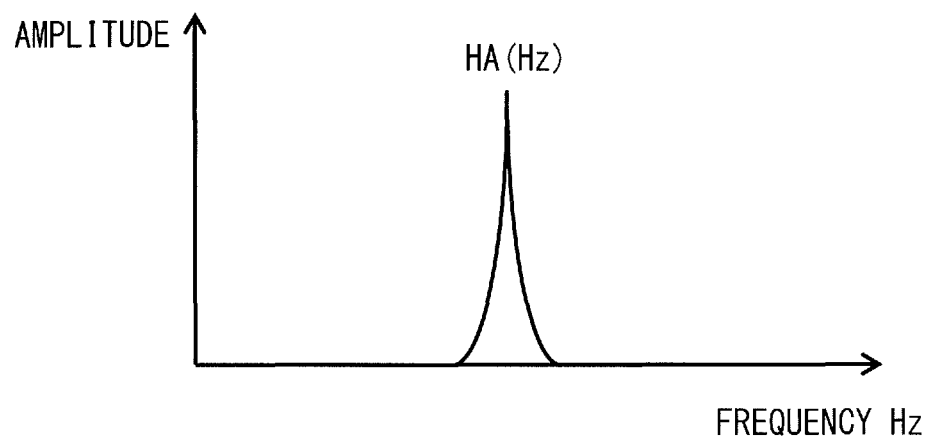
FIG. 10 is a view showing an example of tool axis position deviation data.
Figure 11:
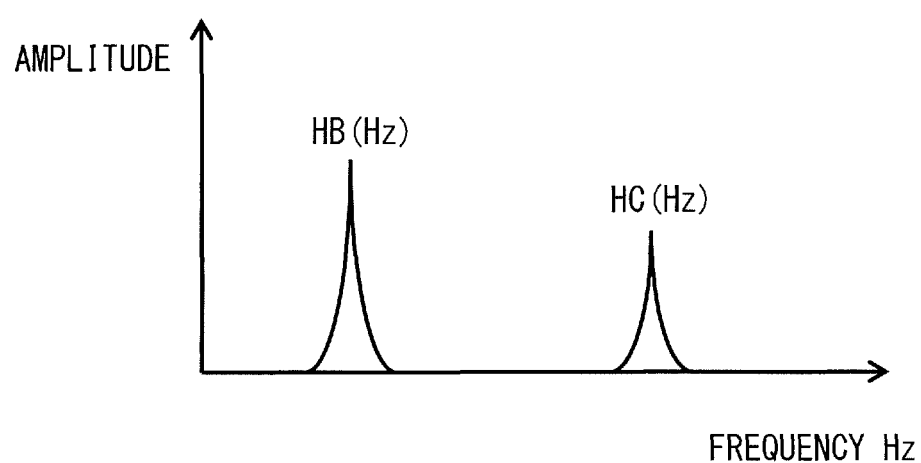
FIG. 11 is a view showing an example of workpiece axis position deviation data.

Next, identification of fd, which is the disturbance frequency, will be considered. Since there are a plurality of combinations of the disturbance frequency fd and the natural number N which satisfy formula (2) above, the position deviation data stored in the axis information storage unit 5 is referred to in order to identify the disturbance frequency. Assumed that, by performing frequency analysis on the position deviation data, there is a peak HA (Hz) in the position deviation data regarding the tool axis CS1, as shown in FIG. 10, and there are two peaks HB (Hz) and HC (Hz) in the position deviation data regarding the workpiece axis CS2, as shown in FIG. 11. In this case, since the disturbance frequency fd is one of HA (Hz), HB (Hz), and HC (Hz), each of HA (Hz), HB (Hz) and HC (Hz) is substituted into formula (2) described above, and the peak which satisfies formula (2) is determined to be the disturbance frequency which causes the undulation of pitch A in the tooth trace direction. For example, when the frequency peak HA (Hz) of the position deviation of the tool axis CS1 has a natural number N which satisfies formula (2), and the frequency peaks HB (Hz) and HC (Hz) of the position deviation of the workpiece axis CS2 have not natural numbers N which satisfy formula (2), the vibration of frequency peak HA (Hz) of the tool axis CS1 is identified as the disturbance component which causes undulation in the tooth trace direction of measured pitch A, and the identified vibration is targeted for a correction process described later.

By the technique described above, the disturbance component which causes undulation in the tooth trace direction can be identified from the measured value of the tooth trace error and actual machining data.

Figure 12:
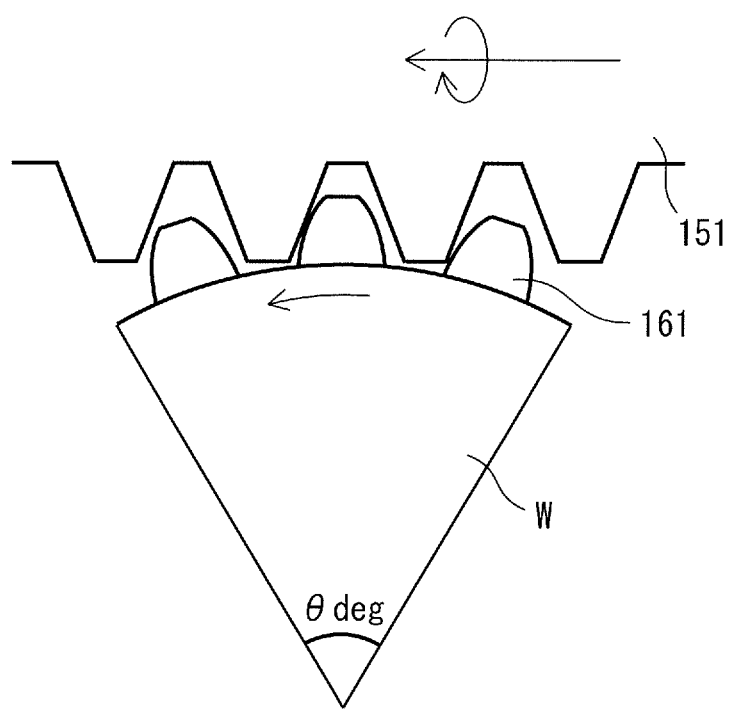
FIG. 12 is a view showing a state in which a tooth trace is created on a workpiece by the teeth of the tool fixed to the tool axis.

Next, identification of the disturbance component from undulation in the tooth profile direction (hereinafter referred to as a tooth profile error) will be described. Let us consider a state in which the tooth trace 161 is created on the workpiece W by the teeth of the tool 151 fixed to the tool axis CS1, as shown in FIG. 12. In this case, the mesh ratio of the workpiece is defined as x. Mesh ratio means the number of teeth of the workpiece that, on average, mesh with the tool. In this case, the tooth profile is created in time t from when the teeth of the workpiece is engaged until they are disengaged. When the number of rotations of the workpiece W during machining is defined as $w_c$ (rpm), and the number of teeth of the workpiece is defined as z, the time t is expressed by the following formula.

$$t = \left(\frac{w_c}{60}\right)^{-1} \times \frac{x}{z} = \frac{60x}{w_c z} (\text{sec})$$

When it is measured that a undulations occur in the tooth profile error in the time t, the frequency fd of the disturbance component causing the undulations is expressed as follows.

$$fd = \frac{a}{t} = \frac{aw_c z}{60x} (\text{Hz}) \tag{3}$$

Next, like the case of undulations in the tooth trace direction described above, it is confirmed whether or not the frequency analysis results of the position deviation data of the axes include a frequency peak which matches the disturbance component fd obtained by formula (3) above. When a frequency peak which matches the disturbance component fd is found in the position deviation data of the axes, that frequency peak is identified as the disturbance component.

Figure 13:
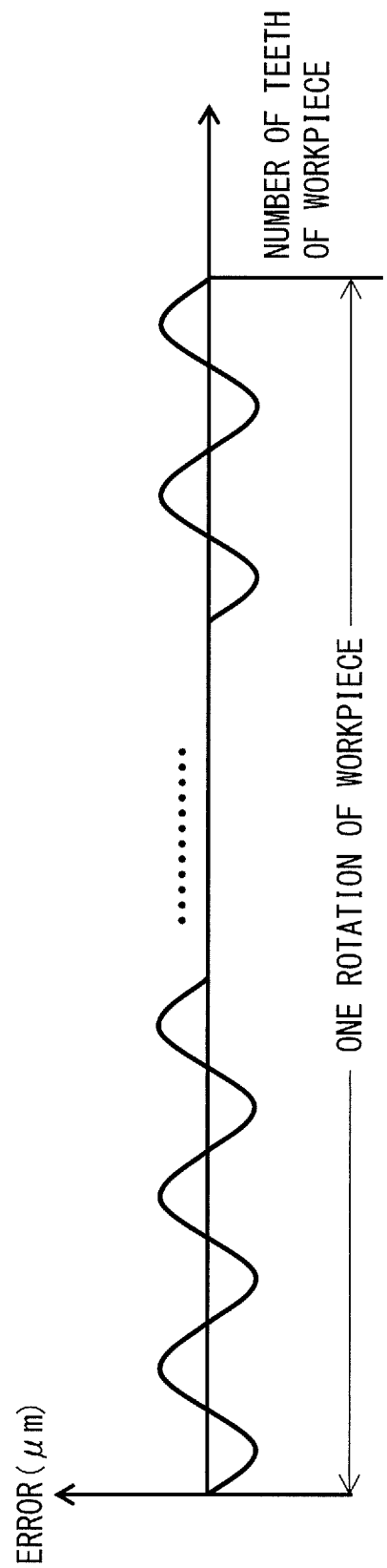
FIG. 13 is a graph showing an example of a single pitch error undulation.

Next, identification of the disturbance component from a single pitch error will be described. "Single pitch error" means the difference between the actual pitch, on the pitch circle, of the same sides of the adjacent tooth surfaces and the theoretical pitch. For example, it is assumed that undulation of a single pitch error occurs as shown in FIG. 13, and the single pitch error has K peaks in one rotation of the workpiece. In this case, the disturbance frequency which causes the single pitch error is simply a vibration component having K repetitions in a single rotation of the workpiece. Thus, the disturbance frequency is obtained by formula (4) below.

disturbance frequency=(rotation number of workpiece)×K (4)

In this case, when a disturbance component having a frequency peak which matches the disturbance frequency obtained from formula (4) is found in the position deviation data of the axes during actual machining stored in the axis information storage unit 5, such disturbance component is identified as the cause of the single pitch error.

Figure 14:
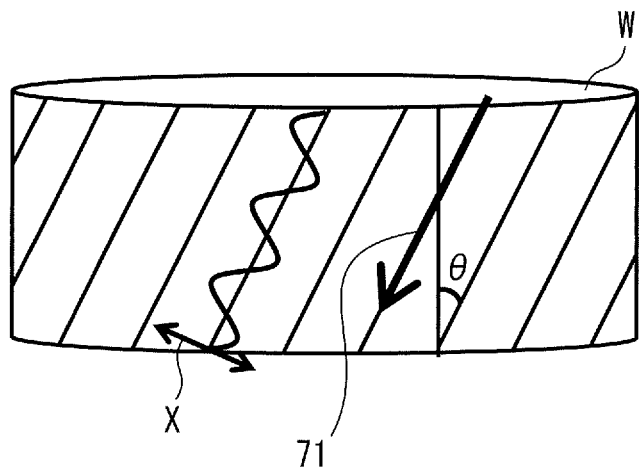
FIG. 14 is a view detailing the amplitude of undulation on the tooth surface of each tooth trace in a helical gear having a helix angle $\theta$.

Next, identification of the disturbance component from the amplitude of the position deviation will be described. The magnitude of the undulation formed on the tooth surface can be determined from the amplitude of the position deviation or synchronization error regarding the tool axis CS1 and the workpiece axis CS2 stored in the axis information storage unit 5. It is assumed the amplitude A1 (deg) is calculated as the undulation in the circumferential direction of the workpiece on the gear pitch circle. In this case, the amplitude x of the undulation on the tooth surface of each tooth trace of the helical gear with a helix angle θ as shown in FIG. 14 is represented by the following formula (5).

$$x = r \times \frac{A1}{180} \pi \times \cos\theta \tag{5}$$

It is assumed that vibrations of amplitude A1 (deg) and frequency B1 (Hz) appear as position deviation of the axis data. The amplitude×(mm) of the undulation produced by this vibration component on the tooth surface is calculated by the above formula (5). Next, this amplitude x is compared with the amplitude of the undulation on the tooth surface obtained by measuring the actually machined workpiece, and when the two amplitudes are close to each other, it can be determined that the probability that the above vibration component is the cause of the tooth trace error is high. However, in order to more accurately identify the disturbance component which causes the undulation of the tooth trace error, it is necessary to calculate the pitch of the undulation in the tooth trace direction from the frequency component B1 (Hz) of the position deviation by the technique described above, and verify that the calculated pitch matches with the pitch of the undulation in the tooth trace direction determined by measuring the actually machined workpiece.

Figure 15:
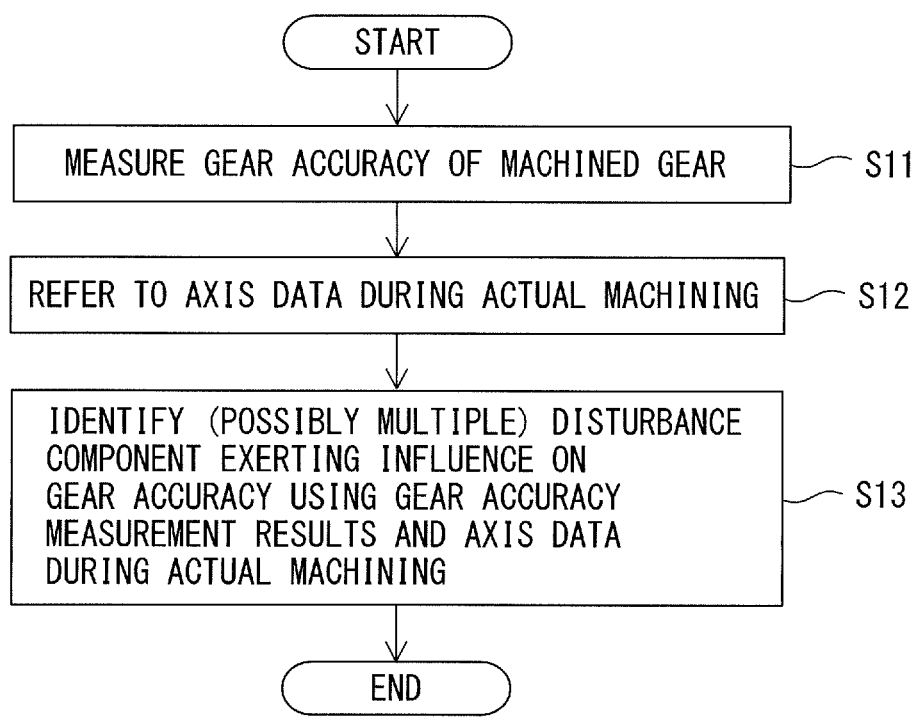
FIG. 15 is a flowchart showing a disturbance component identification method.

The method for identifying the disturbance component described above can be expressed as an operation flow shown in FIG. 15. This process is executed by the disturbance component identification unit 6. First, the gear accuracy (tooth trace error, tooth profile error, single pitch error, amplitude, etc.) of an actually machined gear is measured (step S11). Next, the axis data stored in the axis information storage unit 5 is referenced (step S12). Next, the disturbance component (frequency, amplitude) which exerts an influence on the gear accuracy is identified based on the gear accuracy measurement results and the axis data (step S13). Note that a plurality of disturbance components may be identified in some cases.

Figure 16:
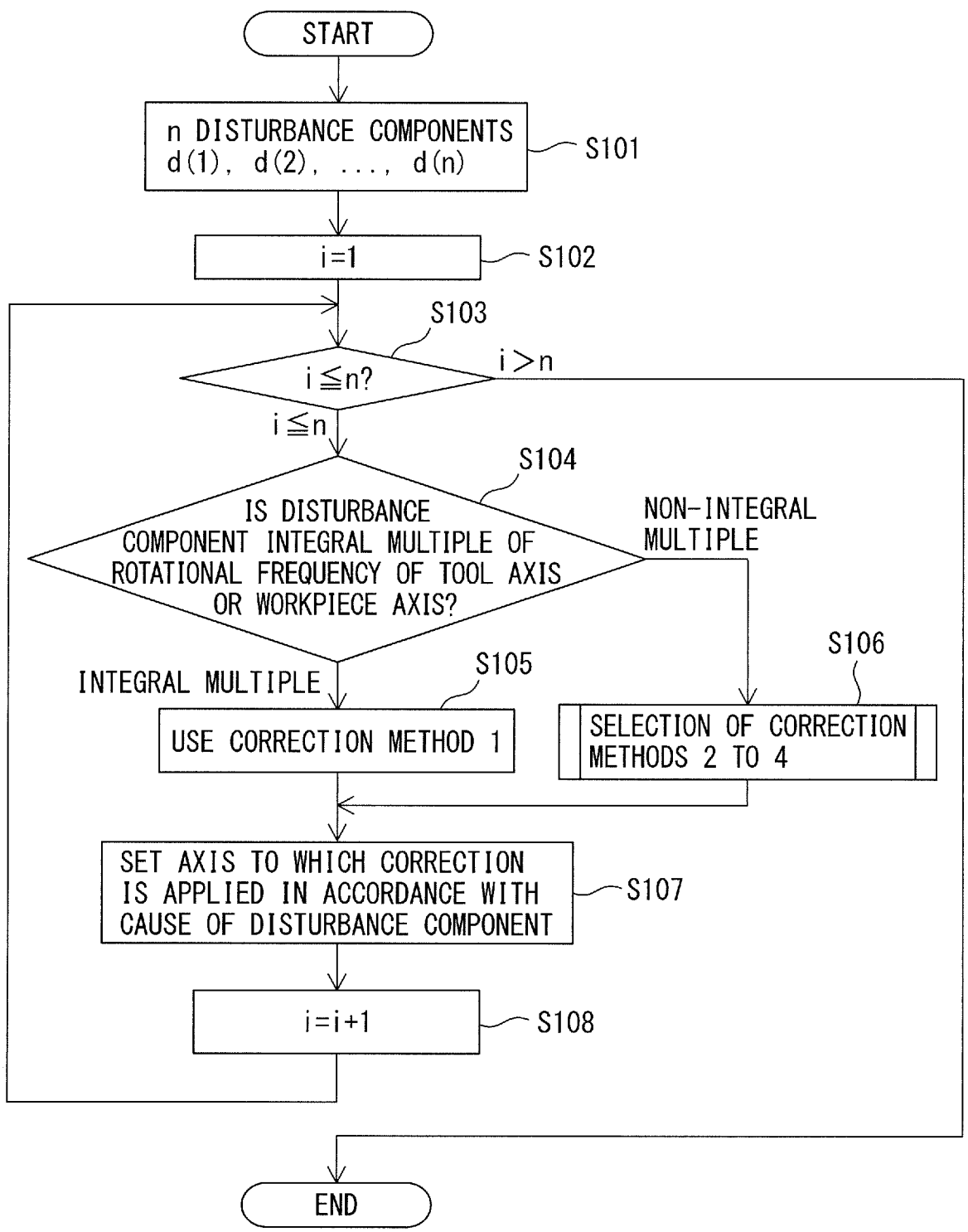
FIG. 16 is a flowchart showing a correction method selection process.

Next, a process for selecting an efficient type of correction corresponding to the disturbance component identified by any of the techniques described above will be described. FIG. 16 shows a general flow of the correction method selection process. This process is executed by the correction method selection unit V. First, in step S101, the disturbance components identified in the disturbance component identification process (FIG. 15) are set to variables d(i) (i=1 to n). Next, i is initialized (step S102), and while the condition that i is equal to or less than n is satisfied, the processes of steps S104 to S107 are performed. In step S104, it is determined whether or not the disturbance component d(i) is an integral multiple of the rotational frequency of the tool axis CS1 or the workpiece axis CS2. When the disturbance component is an integral multiple of the rotational frequency of the tool axis CS1 or the workpiece axis CS2, a correction method 1 (learning control) which is suitable for this type of disturbance component is selected from among a plurality of types of correction methods 1 to 4 stored in advance (step S105).

In learning control, the position deviation can be reduced, for example, by setting, as a learning period, a period of an operation pattern such as one rotation of the workpiece axis, which is effective for suppressing the disturbance component which occurs at a frequency which is an integral multiple of the rotational frequency of the tool axis CS1 or the workpiece axis CS2. Learning control known in the art for determining the correction amount by iterative learning until the position deviation converges to near zero can be used as the learning control. For example, in the learning control, learning, where the position deviation is determined for each predetermined operation pattern period, the correction amount of the prior pattern period is added to the position deviation, a new correction amount is calculated by filtering the results of the addition, the new correction data is stored and the position command is corrected using the correction data, is repeated until the position deviation becomes close to zero. An example of such learning control in a machine tool is described in Japanese Patent No. 4043996B.

Next, the axis identified by the disturbance component identification described above is set as an axis to which the correction is applied (step S107). As a result, an effective correction method can be applied to the axis that causes the disturbance in a subsequent machining operation. In step S108, i for executing the processes of step 103 to step 107 for a next disturbance component is incremented.

Figure 17:
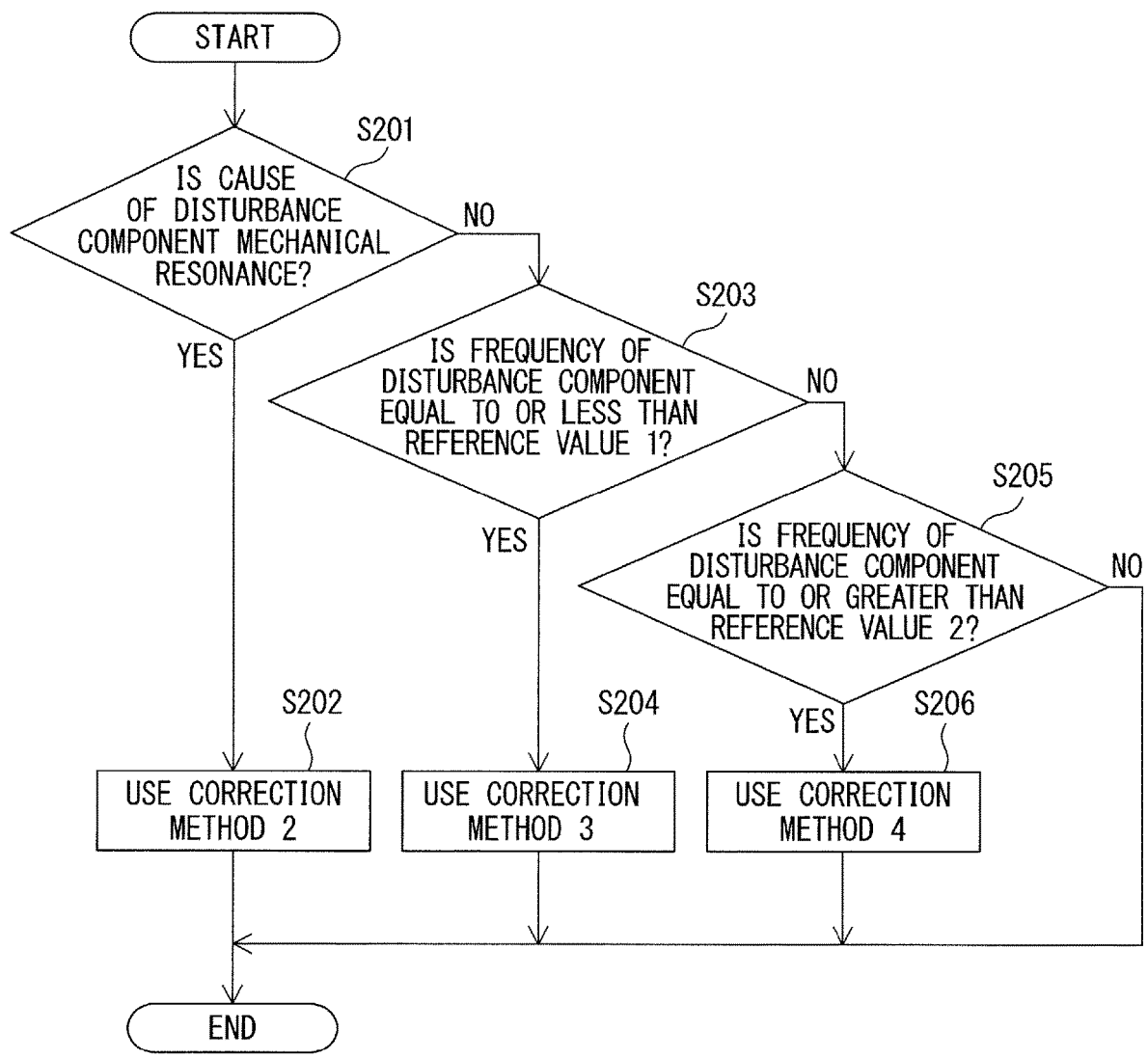
FIG. 17 is a flowchart of the process for selecting the correction method.
Figure 18:
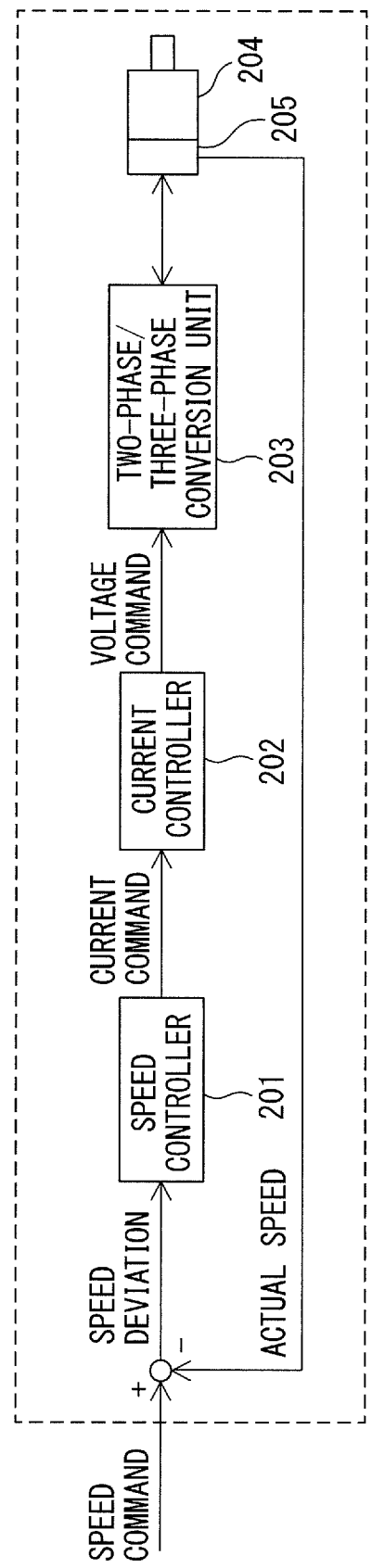
FIG. 18 is a view showing a configuration example of a drive axis control system.
Figure 19:
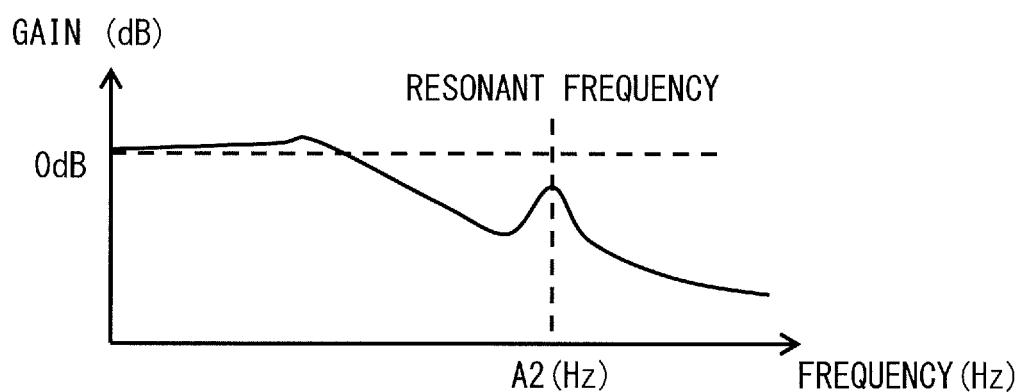
FIG. 19 is a view showing an example of control system speed control loop frequency characteristics.

On the other hand, when the disturbance component d(i) is not an integral multiple of the rotational frequency of the tool axis CS1 or the workpiece axis CS2, in step S106, selection from correction methods 2 to 4 is performed. FIG. 17 is a flowchart of a process for selecting from correction methods 2 to 4. First, in step S201, it is determined whether or not mechanical resonance is the cause of disturbance component d(i). The method for determining whether or not the disturbance component is mechanical resonance will be described. The control system of the drive axes comprises, for example, a speed controller 201 which generates a current command in accordance with a speed command and an actual speed detected by a speed sensor 205, a current controller 202 which generates a voltage command corresponding to the current command, a two-phase to three-phase conversion unit 203 which performs two-phase to three-phase conversion for the voltage command, and a motor 204 having the speed sensor 205, as shown in FIG. 18. Assume that, by measuring the frequency characteristics of the speed control loop described above, frequency characteristics as shown in FIG. 19 are obtained. When there is an increase in the gain derived from the mechanical resonance at A2 (Hz) in the frequency characteristics obtained as a result of the measurement, as shown in FIG. 19, vibration of A2 (Hz) may occur during machining operation. In step S201, it is determined whether or not the disturbance frequency d(i) matches with the mechanical resonance frequency A2 (Hz) determined in advance. As a result of the determination, when the disturbance frequency d(i) matches with the mechanical resonance frequency A2 (Hz) determined in advance, the disturbance frequency d(i) is determined to be the mechanical resonance (YES in step S201), and correction method 2 (notch filtering), which is effective for mechanical resonance, is selected.

Note that, as a method for determining the mechanical resonance frequency in advance, a method of examining the mechanical resonance frequency by performing a hammering test on the mechanism of the machine tool 100 can be used. Assume that, for example, the resonant frequencies of A3 (Hz), B3 (Hz), and C3 (Hz) appear through the hammering test. In this case, when one of A3, B3, and C3 is identified as the disturbance frequency by the disturbance frequency identification unit 6, in step S201, it is determined that the disturbance frequency d(i) is mechanical resonance (YES in step S201), and correction method 2 (notch filtering) is selected (step S202).

A notch filter is a filter which removes a frequency component of a specific band. When notch filtering is selected in step S202, in the control unit Cn to which the notch filter is applied, a notch filter having filter characteristics in which the peak of the mechanical resonance frequency (e.g., A3 (Hz)) specified in step S201 is removed is configured within the control system.

Conversely, when it is determined in step S201 that the disturbance component d(i) is not mechanical resonance (NO in step S201), it is determined whether or not the frequency of the disturbance component d(i) is equal to or less than a reference value 1 (step S203). It is only necessary that the reference value 1 be a value for determining whether the disturbance has a relatively low frequency. When the frequency of the disturbance component d(i) is equal to or less than the reference value 1 (YES in step S203), correction method 3, which is effective for correction of relatively low frequency disturbances, is selected.

Any of various correction methods which are known in the art as being effective for the correction of relatively low frequency disturbances can be used as correction method 3. An example of correction method 3 is technique where control is performed by combining feedback synchronous control, in which the feedback of a master axis (tool axis) is multiplied by a synchronization ratio to obtain a slave axis (workpiece axis) command, and command synchronization control in which a slave axis command is obtained by multiplying the command for the master axis by the synchronization ratio (hereinafter referred to as a combined function). For example, such a combined function can be executed by technique where the position feedback of the master axis is converted into position feedback of the slave axis using the synchronization ratio, a synchronization error is calculated from the difference between the converted position feedbacks of the master axis and the slave axis, the difference between the calculated synchronization error and the position deviation of the slave axis is filtered, and the position deviation of the slave axis is corrected in accordance with filter output. By using such a combined function, for example, the phenomenon in which accuracy decreases at the start of machining can be improved. An example of the combined function is described in Japanese Patent No. 5815784B. Since correction method 3 (combined function) is effective for relatively low frequency disturbances, a value of, for example, about 150 Hz may be set as the reference value 1 within a servo controllable range.

Conversely, when it is determined in step S203 that the frequency of the disturbance component d(i) is not equal to or less than reference value 1 (NO in step S203), it is determined whether or not the frequency of disturbance component d(i) is equal to or greater than reference value 2 (step S205). It is only necessary that reference value 2 be a value with which it can be determined whether the disturbance frequency is a relatively high frequency. When it is determined that the frequency of disturbance component d(i) is equal to or greater than reference value 2 (YES in step S205), correction method 4 (vibration suppression control), which is effective in the case of relatively high disturbance frequencies, is selected.

Any method known in the art as the vibration suppression control can be used. An example of vibration suppression control is control where, when machining is performed while two axes, a tool axis and a workpiece axis, are synchronized at a predetermined speed ratio, a correction amount for reducing vibration is calculated using the speed difference between the two axes, and vibration due to interference between the two axis is reduced by correcting a torque command using the correction amount. An example of such vibration suppression control is described in Japanese Patent No. 5863860B. Since vibration suppression control is effective for suppressing mechanical vibrations having a relatively high frequency (e.g., 300 Hz), reference value 2 may be set to, for example, 200 Hz.

When it is determined that the frequency of disturbance component d(i) is not equal to or greater than reference value 2 (NO in step S205), selection of a particular correction method may not be performed. When the correction method selection process of FIG. 17 ends, the process returns to step S107 of FIG. 16.

As described above, according to the present embodiments, a disturbance component which exerts an influence on the accuracy of a machined workpiece can be identified. As a result, an efficient type of correction for improving the accuracy of the workpiece can be precisely selected.

Though the embodiments of the present disclosure have been described above, a person skilled in the art would understand that various corrections and modifications can be made without deviating from the scope disclosed in the claims, which are described later.

In the embodiments described above, when a disturbance component due to tooth trace error is identified, position deviation (or synchronization error) data stored in the axis information storage unit 5 is used as frequency information to calculate the undulation frequency; however time may be added to the information stored in the axis information storage unit 5. In this case, the axis information storage unit 5 stores the machining start time as a reference time, and associates the time during machining with the position deviation or synchronization error. In this case, for example, the shape of the error in the tooth trace direction formed on each tooth surface due to the position deviation can be calculated, and rather than only the undulation pitch, the undulation phase, etc., can be calculated.

The disturbance component may change in amplitude or may occur more than once depending on the processing position and time, and thus, it is thought that the shape of the undulation appearing on each tooth surface in the tooth trace direction may change accordingly. By storing the reference time of the position deviation, the detailed shape of the undulation in the tooth trace direction corresponding to such a phenomenon can be calculated, whereby more detailed identification of the disturbance component is possible.

Though the aforementioned embodiments have been described regarding the case in which gear generation cutting is performed mainly by rotating a tool axis and a workpiece axis in synchronization, the machine tool according to the present embodiment can also be used for gear forming and gear grinding. In the case of, for example, gear forming, machining is performed with a milling machine using a cutting tool having the same shape as the groove of the gear. Since the workpiece axis is stationary and the gear grooves are formed one by one, the tool axis and the workpiece axis can be considered as rotating at a synchronization ratio of 1:0.

In order to achieve the object of the present disclosure, the following aspects and the effects thereof can be provided. Note that in the descriptions of the following aspects, the parenthesized numerals correspond to the reference signs of the drawings of the present disclosure.

For example, the first aspect of the present disclosure provides a controller (1) for controlling a gear cutting machine having a plurality of axes, the controller comprising an axis information storage unit (5) configured to store data related to control of the plurality of axes during machining, and a disturbance component identification unit (6) configured to identify a component of disturbance with respect to the plurality of axes using the data stored by the axis information storage unit (5) and measurement results of machining accuracy of a workpiece machined by the gear cutting machine.

According to the first aspect, the disturbance component which exerts an influence on the accuracy of the machined workpiece can be identified. As a result, an efficient type of correction for improving the accuracy of the workpiece can be precisely selected.

The second aspect of the present disclosure provides the controller (1) according to the first aspect, further comprising a correction selection unit (7) configured to select, in accordance with the identified component of the disturbance, a correction to be applied to the control of the plurality of axes in order to cancel the disturbance, from among a plurality of types of corrections stored in advance.

The third aspect of the present disclosure provides the controller (1) according to the second aspect, wherein the correction selection unit (7) selects, from among the plurality of axes, an axis to which the correction is applied in accordance with the identified component of the disturbance.

The fourth aspect of the present disclosure provides the controller (12) according to the second aspect or the third aspect, wherein the disturbance component identification unit (6) identifies a frequency of the component of the disturbance, and the correction selection unit (7) selects a different type of correction between a case where the frequency of the component of the disturbance is proportional to a rotational frequency of one of the plurality of drive axes and a case where the frequency of the component of the disturbance is proportional to the rotational frequency of none of the plurality of drive axes.

The fifth aspect of the present disclosure provides the controller (1) according to any one of the first aspect through the fourth aspect, wherein the data includes one of position deviation of each of the plurality of axes and a synchronization error between two of the plurality of axes, and the disturbance component identification unit (6) identifies the component of the disturbance by calculating an undulation in a tooth trace direction on a tooth surface of the workpiece based on one of the position deviation and the synchronization error, and comparing the calculated undulation in the tooth trace direction with an undulation in the tooth trace direction on the tooth surface of the workpiece obtained by measuring the machined workpiece.

The sixth aspect of the present disclosure provides the controller (1) according to any one of the first aspect to the fourth aspect, wherein the data includes one of position deviation of each of the plurality of axes and a synchronization error between two of the plurality of axes, and the disturbance component identification unit (6) identifies the component of the disturbance by comparing a frequency component appearing on one of the position deviation and the synchronization error with a frequency component calculated from a number of undulations in a tooth profile direction of a tooth surface on the workpiece obtained by measuring the machined workpiece.

The seventh aspect of the present disclosure provides the controller (1) according to any one of the first aspect through the fourth aspect, wherein the data includes one of position deviation of each of the plurality of axes and a synchronization error between two of the plurality of axes, and the disturbance component identification unit (6) identifies the component of the disturbance by comparing a frequency component appearing on one of the position deviation and the synchronization error with a frequency component calculated from a number of undulations appearing on a single pitch error within a rotation of a gear obtained by measuring the machined workpiece.

The invention claimed is:

1. A controller for controlling a gear cutting machine having a plurality of axes, the controller comprising:
   an axis information storage unit configured to store data related to control of the plurality of axes during machining, and
   a disturbance component identification unit configured to identify a component of disturbance with respect to the plurality of axes by using the data stored by the axis information storage unit and measurement results, received from measurement equipment coupled to the disturbance component identification unit, of machining accuracy of a workpiece machined by the gear cutting machine.

2. The controller according to claim 1, further comprising a correction selection unit configured to select, in accordance with the identified component of the disturbance, a correction to be applied to the control of the plurality of axes in order to cancel the disturbance, from among a plurality of types of corrections stored in advance.

3. The controller according to claim 2, wherein the correction selection unit selects, from among the plurality of axes, an axis to which the correction is applied in accordance with the identified component of the disturbance.

4. The controller according to claim 2, wherein the disturbance component identification unit identifies a frequency of the component of the disturbance, and
   the correction selection unit selects a different type of correction between a case where the frequency of the component of the disturbance is proportional to a rotational frequency of one of the plurality of drive axes and a case where the frequency of the component of the disturbance is proportional to the rotational frequency of none of the plurality of drive axes.

5. The controller according to claim 1, wherein the data includes one of position deviation of each of the plurality of axes and a synchronization error between two of the plurality of axes, and
   the disturbance component identification unit identifies the component of the disturbance by calculating an undulation in a tooth trace direction on a tooth surface of the workpiece based on one of the position deviation and the synchronization error, and comparing the calculated undulation in the tooth trace direction with an undulation in the tooth trace direction on the tooth surface of the workpiece obtained by measuring the machined workpiece.

6. The controller according to claim 1, wherein the data includes one of position deviation of each of the plurality of axes and a synchronization error between two of the plurality of axes, and
   the disturbance component identification unit identifies the component of the disturbance by comparing a frequency component appearing on one of the position deviation and the synchronization error with a frequency component calculated from a number of undulations in a tooth profile direction on a tooth surface of the workpiece obtained by measuring the machined workpiece.

7. The controller according to claim 1, wherein the data includes one of position deviation of each of the plurality of axes and a synchronization error between two of the plurality of axes, and
   the disturbance component identification unit identifies the component of the disturbance by comparing a frequency component appearing on one of the position deviation and the synchronization error with a frequency component calculated from a number of undulations appearing on a single pitch error within a rotation of a gear obtained by measuring the machined workpiece.

* * * * *